United States Patent [19]

Dewey

[11] 4,191,040
[45] Mar. 4, 1980

[54] FERRULE ROLLING MACHINE

[76] Inventor: Herbert F. Dewey, 5110 Brookpark Rd., Cleveland, Ohio 44134

[21] Appl. No.: 848,830

[22] Filed: Nov. 7, 1977

[51] Int. Cl.$^2$ ............................................. B21D 5/12
[52] U.S. Cl. ....................................... 72/132; 72/181; 72/203
[58] Field of Search ..................... 83/36, 56, 107, 703; 72/51, 52, 129, 180, 181, 203, 179, 182, 246, 248, 132

[56] References Cited

U.S. PATENT DOCUMENTS

| | | | |
|---|---|---|---|
| 2,012,795 | 8/1935 | Park | 72/181 |
| 2,098,989 | 11/1937 | Yoder | 72/181 |
| 2,582,062 | 1/1952 | Peters et al. | 72/181 |
| 3,312,095 | 4/1967 | Remack et al. | 72/203 |
| 3,405,880 | 10/1968 | Bielert | 83/36 X |
| 3,945,233 | 3/1976 | Dewey | 72/181 |
| 4,109,499 | 8/1978 | Brooks et al. | 72/181 |
| 4,122,696 | 10/1978 | Midzutani et al. | 72/52 |

FOREIGN PATENT DOCUMENTS

| | | | |
|---|---|---|---|
| 319160 | 2/1920 | Fed. Rep. of Germany | 72/179 |
| 2443689 | 3/1975 | Fed. Rep. of Germany | 72/248 |
| 719358 | 2/1932 | France | 72/182 |

Primary Examiner—Ervin M. Combs
Attorney, Agent, or Firm—Oldham, Oldham, Hudak & Weber Co.

[57] ABSTRACT

Apparatus for forming a sheet metal strip into metal ferrules comprising edge guide means to feed a continuous metal strip into a pair of trim rolls to cut the metal strip to a desired width, and means engage the surplus portion of the metal strip and guide it through a controlled path to return to the edge guide means. A pair of notching or cutting rolls notch the metal strip transversely at axially spaced portions for forming ferrule sections in the continuous strip, and a plurality of pairs of forming rolls for engaging the strip and rolling it to substantially cylindrical shape, which pairs of rolls each have one resiliently positioned roll mounted on a frame by laterally extending support plates.

1 Claim, 11 Drawing Figures

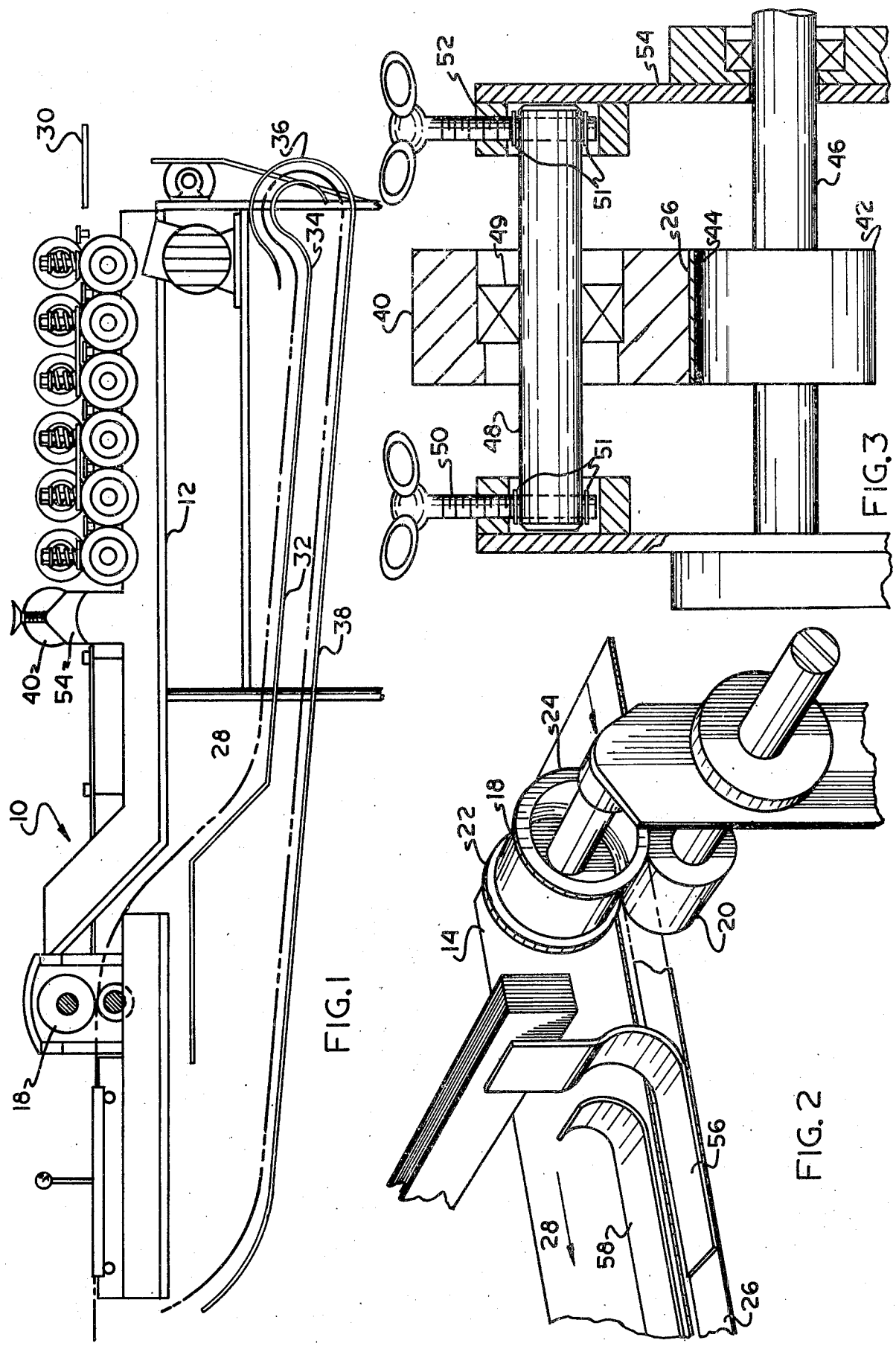

FERRULE ROLLING MACHINE

BACKGROUND OF INVENTION

In the positioning of gutters and rainspouts on building structures, a plurality of metal ferrules are required for aiding in securing the gutters to but spaced from the building. These metal ferrules usually are elongate tubes having an axially extending split therein, and these ferrules have been somewhat costly to produce heretofore. The ferrules are used in quantities by builders and any reduction in the cost of the ferrule can result in an appreciable savings to persons working with large numbers of ferrules for use in positioning gutters on a variety of buildings as a part of building actions of such person.

Prior types of sheet metal strip roll-forming apparatus have been known, and examples of them are shown in my own prior U.S. Pat. Nos. 3,785,191 and 3,945,233. However, the apparatus shown in such prior patents is not designed for, nor adapted to provide metal ferrules, and it is desirable to produce uniform quality ferrules in large quantities by inexpensive forming actions on sheet metal strips.

OBJECTS OF INVENTION

The general object of the present invention is to provide relatively inexpensive, but effective roll apparatus for cutting a sheet metal strip to a desired width, cutting the metal strip into ferrule forming sections, and then gradually rolling the metal strip to ferrule shape and providing the individual ferrules desired.

Another object of the invention is to position a pair of metal rolls in adjustable pressure rolling association and wherein the one roll is readily disengageable from the roll assembly.

Another object of the invention is to position pairs of sheet metal forming and/or engaging and/or notching rolls in adjustable pressurized and/or spacing relationship by use of set screw members engaging a support means and a roll support shaft.

Yet another object of the invention is to facilitate the formation of metal ferrules efficiently and effectively and at low cost from an elongate strip of scrap sheet metal which is readily processed or moved through the apparatus several times to sever edge strips therefrom and represent the remaining portion of the strip to the apparatus for further processing, including again severing an edge strip therefrom and processing such edge strip to form metal ferrules therefrom.

The foregoing and other objects and advantages of the invention will be made more apparent as the specification proceeds.

Attention now is particularly directed to the accompanying drawings, wherein:

FIG. 1 is a side elevation, partially shown in vertical section and partly diagrammatic of the ferrule rolling apparatus of the invention;

FIG. 2 is a fragmentary perspective view of the portion of the apparatus for severing an edge strip from a strip of sheet metal;

FIG. 3 is a fragmentary vertical section taken on line 3—3 of FIG. 1;

When referring to corresponding members shown in the drawings and referred to in the specification, corresponding numerals are used to facilitate comparison therebetween.

SUBJECT MATTER OF INVENTION

Figure 9:
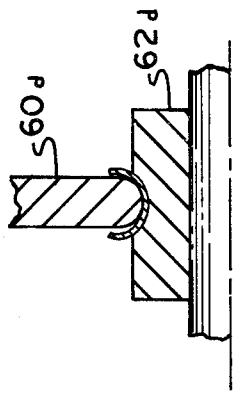
FIGS. 6–11 are progressive fragmentary vertical sections through the associated pairs of rolls for rolling and/or forming the metal strip into substantially tubular or cylindrical form.
Figure 10:
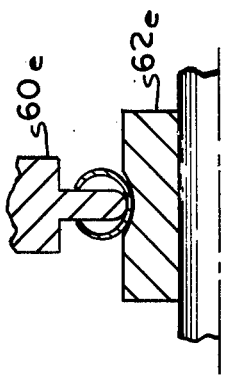

This apparatus for forming metal ferrules from sheet metal strips comprises edge guide means for feeding a metal strip into a pair of trim rolls to cut a predetermined width edge strip therefrom, and means usually are present to engage the surplus portion of the metal strip and guide it through a controlled path to return it back to the edge guide means for a further edge strip severing action, a pair of notching rolls for notching or scoring the metal strip transversely at axially spaced portions for forming ferrule sections in the continuous strip, and a plurality of pairs of forming rolls for engaging the strip and rolling it to substantially cylindrical shape, each pair of rolls having one resiliently positioned roll therein mounted on the frame of the apparatus by laterally extending support plates engaging the frame means by readily removable means.

Attention now is particularly directed to the details of the structure shown in the drawings and the apparatus for forming metal ferrules from sheet metal strip is indicated as a whole by the numeral 10. This apparatus 10 includes a suitable frame means 12, and the apparatus is adapted to process a sheet metal strip to form metal ferrules therefrom.

Figure 5:
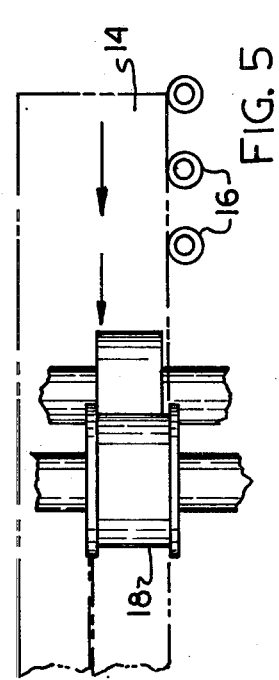
FIG. 5 is a plan view, partially diagrammatic, of the apparatus for guiding the sheet metal strip into the apparatus for cutting a desired width strip therefrom.

FIG. 5 shows a sheet metal strip or piece 14 engaging suitable edge guide rolls 16 positioned in alignment on the frame 12 which rolls position the sheet to pass through a pair of trim rolls 18 and 20 where the upper trim roll, in this instance, has a pair of edge flanges 22 and 24 formed thereon which edge flanges are bridged over and are closely aligned with the side edges of the trim roll 20 whereby as the sheet metal portion 14 is moved along to be processed by the trim rolls 18 and 20, and an edge strip 26 is cut therefrom, the remaining section 28 of the sheet metal usually moves through a different controlled path from the edge strip 26 that moves from the trim rolls 18 and 20 into the remaining portions of the apparatus for being progressively rolled and formed into the desired tubular metal ferrule 30 produced by the apparatus.

FIG. 1 indicates that the residual sheet metal section 28, usually an elongate piece of sheet metal, is moved along a lower portion of the frame 12 to engage and/or be supported on a plate 32 that has a reverse bend 34 provided therein adjacent the end portion of the frame 12. A guide plate 36 is positioned adjacent, above and usually parallel to this plate 32 at the bend or end portion therein, which guide plate 36 extends back along the apparatus below the plate 32, as indicated at 38, to guide the sheet section 28 back to the forward or input end of the apparatus. Then the leading end of the sheet section 28 can be manually grasped or be guided by other means, not shown, so as to be moved, guided, lifted or bent to move upwardly and rearwardly in the apparatus to come back into the position indicated in FIG. 5 for the metal sheet 14, but which sheet is now of reduced width to be again processed by having an edge section cut therefrom for working in the apparatus.

Obviously the trim rolls 18 and 20 are so designed as to provide an edge strip 26 of desired width to provide the desired diameter of finished metal ferrule by the apparatus.

From the trim rolls 18 and 20, the edge strip 26 moves into and is engaged by a pair of notching rolls 40 and 42 wherein the upper notching roll 40 is cylindrical in its periphery but which has resilient pressure engagement with the lower notching roll 42 that is of cylindrical peripheral contour. A cutter bar or scoring blade 44 projects from the periphery of the roll 42 and extends the axial width of the roll, as indicated in FIG. 3, whereby the metal edge section being processed will have a scoring or notch mark provided thereon extending the width of the edge strip 26 at desired longitudinally spaced portions thereof. Preferably this lower notching roll 42 is mounted on a shaft 46 suitably journalled on the frame 12 in a fixed position. The upper notching roll 40 is mounted on a shaft 48 by suitable bearing means 49, and this shaft 48 is adjustable vertically on an axis perpendicular to the axis of the shaft 46. FIGS. 3 indicates that a pair of set screws 50 engage support brackets 52 that may be tubular, and wherein such support brackets 52 are secured to edge plates 54 fixed to a lower portion of the apparatus. Normally the tubular brackets 52 are larger in diameter than the shaft 48 so that as these set screws 50, that are in threaded engagement with the brackets are rotated, then the shaft 48, which is solely supported by the set screws 50, can be moved vertically with relation to the shaft 46 and the cutting or notching pressure action provided between the blade 44 and notching roll 40 can be varied depending upon the gauge of metal being processed, the depth of the notch desired, etc. Thus, a very easily controlled notching pressure relationship is established between the means mounting the rolls 40 and 42 in the apparatus and the strip 26 has readily separable sections therein.

A guide 56 is shown on the frame 12 to aid in controlling the feed of the edge strip 26 as it moves towards the notching rolls 40 and 42 whereas another guide 58 can engage the sheet section 28 to aid in feeding it into and guiding it along the path indicated in FIG. 1.

Figure 11:
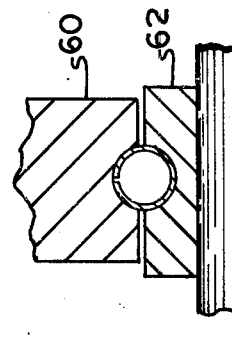
Figure 4:
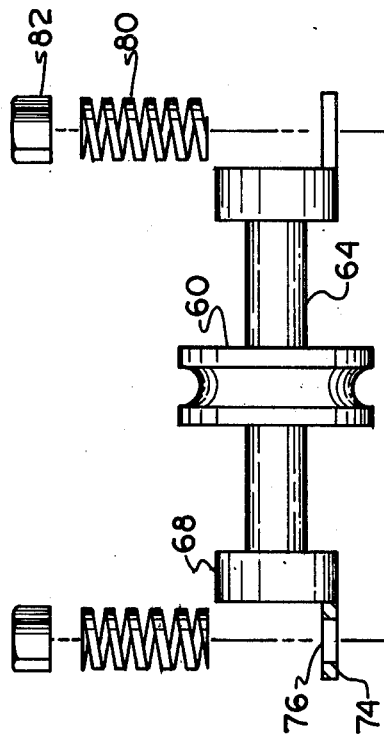
FIG. 4 is an exploded view of a pair of forming rolls and associated support means in the apparatus.

A plurality of forming rolls or roll stands are present in the apparatus, and FIG. 4 indicates the construction and positioning of a typical pair of these forming rolls indentified by the numerals 60 and 62. Preferably six different pairs of forming rolls are provided and these rolls 60 and 62 are the last pair of forming rolls wherein the sheet section 26 being processed is now in substantially tubular shape as indicated in FIG. 11. An adjustable pressure, easily disassembled apparatus is provided for positioning the rolls 60 and 62 in operative engagement and thus shafts 64 and 66 for these rolls are journalled in suitable roller bearings 68 and 70, a pair of which engage opposite ends of the shafts 64 and 66. The roller bearing 70 is of the type wherein a somewhat sizable radial length stationary peripheral ring is provided in the bearing and these stationary rings or collars then are secured, as by welding, to portions of the frame 12 as indicated by the T-bars 72 of FIG. 4. Then to position the roll 60 in operative engagement with the roll 62, the smaller diameter bearings 68 each preferably have an end or edge plate or bracket 74 secured, as by welding, to a lower portion thereof to extend laterally therefrom. These edge plates 74 have apertures 76 therein and they are adapted to engage with threaded studs 78 secured to the outer rings of the bearings 70 and extending vertically upwardly therefrom to receive and position the edge plates 74 thereon. Normally the edge plates would just seat against the upper surface of these outer rings on the bearings 70, and the edge plates are held in operative position by springs 80 telescoped over the studs 78 and secured in position by nuts 82 to provide an adjustable and releasable pressure retaining the rolls 60 and 62 in operative engagement. Hence, when desired, the nuts 82 can be readily removed, the springs 80 pulled off of the studs and the upper rolls of each of the roll stands can be removed for cleaning or adjustment purposes as desired. Inasmuch as only sheet metal material is to be operated on by the apparatus of the invention, the use of relatively lightweight rolls, shafts and springs is possible and still desirable and accurate rolling conditions and operations can be provided.

Figure 6:
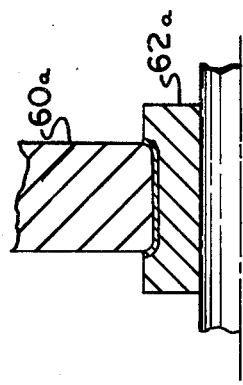
Figure 7:
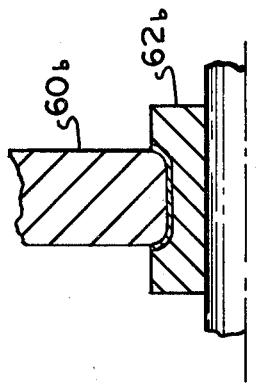
Figure 8:
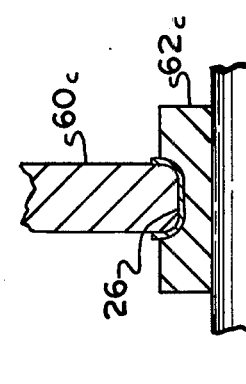

FIGS. 6 through 11 show the progressive rolling action of the initial roll stand 60a, 62a, of FIG. 6, wherein the initial curvature at the edges of the edge strip 26 is started and then the remaining rolls 60b, 62b; 60c, 62c; 60d and 62d; and 60e and 62e are provided to provide five forming actions with progressive shaping of the edge section into the tubular member desired as shown in the end or final roll stands 60 and 62 of FIG. 11.

It should be also understood that the metal ferrules being produced are longer in length than the distance between the adjacent roll stands used in processing the metal strip of the invention. Thus, all of the rolls, including the notching rolls 40 and 42 up through the final roll stand 60 and 62 are all in such closely spaced relationships in a direction axially of the apparatus, that the metal strip is continually being engaged by two of the roll stands, but when only engaged with the final roll stands 60 and 62, and as it leaves therefrom, the metal has been so shaped and worked during the processing by the apparatus that it has been severed into individual axial lengths at the transverse notches therein by such working and the individual ferrules will be propelled out from the roll stands 60 and 62 for receipt in any suitable container positioned thereadjacent.

The apparatus is driven in the manner shown in U.S. Pat. No. 3,945,233. That is one support shaft for each pair of rolls projects slightly laterally of the frame and a common driven chain drive means or other known members engage the shafts for unitary power supply and drive action.

This apparatus of the invention provides uniform quality ferrules, and the apparatus can be easily adjusted for working with different gauges of metal if desired, and the apparatus is efficient since it can take any suitable length and width piece of sheet metal, cut edge sections therefrom and process the cut edge sections into finished products. Usually the strip of metal being processed is of sufficient width that a plurality of edge cuts can be made therefrom and thus the apparatus of the invention conveniently returns the metal sheet being processed back to the entrance end of the apparatus for another pass therethrough after the first pass of the metal sheet is completed. The apparatus of the invention is easily adjusted in cutting pressure actions by the roll means shown in FIG. 3, and the sections processed can be varied in length dependent upon the particular rolls used to form the notching rolls 40 and 42 and the particular size and shape of the trim rolls 18 and 20. The apparatus is low in cost but effective in action. Hence, it is believed that the objects of the invention have been achieved.

It should be realized that the metal strip 28 is led back to a position adjacent the guides 16 and rolls 18 and 20 by the means 32, 34, 36 and 38. It is only fed into the apparatus again when the prior strip 26 clears the apparatus.

The adjustment of position of the shaft 48 can be achieved by any known means to enable the shaft to be moved relative to the fixed shaft 48 and the screws 50 could extend through the shaft 48, be secured to the shaft by top and bottom split lock rings 51, and the screw 50 not be in threaded engagement with the shaft.

While one complete embodiment of the invention has been disclosed herein, it will be appreciated that modification of this particular embodiment of the invention may be resorted to without departing from the scope of the invention.

I claim:

1. Apparatus for forming metal ferrules from a sheet metal strip comprising edge guide means for a continuous sheet metal strip to feed it on a desired edge axis, a pair of trim rolls to cut the metal strip to a desired width strip and to a residual edge section, guide means engaging said edge section and guiding it through a controlled path to return it to said edge guide means, notching roll means to notch the metal strip transversely at axially spaced portions but to leave the strip continuous, a plurality of pairs of forming rolls for engaging said strip and rolling it to substantially cylindrical shape, said pairs of forming rolls being spaced longitudinally from each other less than the distance between the transverse notches on said strip whereby no separate guides are required for said strip as it moves through said rolls, drive means for said rolls, and where said notching roll means includes a pair of rolls each comprising a support shaft and where one of said rolls is cylindrical and the other of said rolls is cylindrical but also has a transversely extending surface notch member thereon, a pair of support members for one of said rolls fixedly secured to support means for the other of said shafts and extending upwardly therefrom, and adjustment means comprising a pair of set screws threadedly mounted on said support members to position the two ends of the support shaft for said one roll to adjust it vertically in relation to the support shaft for said other of said rolls and to retain it in a given position;

said forming rolls being adapted to work and shape said edge section to break it into individual pieces at the notch portions thereof for discharge of separate metal ferrules, said pairs of forming rolls being so spaced longitudinally from each other that a metal ferrule being processed is always engaged by two pairs of forming rolls, and said adjustment means include brackets on said support members, said set screws threadedly engaging said brackets and extending therethrough to engage and extend unthreadedly through said one roll support shaft, and locking ring means securing said one roll support shaft to said set screws.

* * * * *